March 3, 1953 J. W. RIEKE 2,630,486

LOW-FREQUENCY RESTORATION CIRCUIT

Filed Jan. 26, 1949 3 Sheets-Sheet 1

INVENTOR
J. W. RIEKE
BY Hugh S. Wertz
ATTORNEY

INVENTOR
J. W. RIEKE
BY Hugh S. Wertz
ATTORNEY

INVENTOR
J. W. RIEKE
BY
Hugh S. Wertz
ATTORNEY

Patented Mar. 3, 1953 2,630,486

UNITED STATES PATENT OFFICE 2,630,486

LOW-FREQUENCY RESTORATION CIRCUIT

John W. Rieke, Basking Ridge, N. J., assignor to Bell Telephone Laboratories, Incorporated, New York, N. Y., a corporation of New York Application January 26, 1949, Serial No. 72,800

3 Claims. (Cl. 178—44)

This invention relates to the reduction of distortion in electrical signals and more specifically to clamper circuits for reducing distortion in television signals. A television clamper or clamper circuit can be defined as a device which samples the departure of the television wave from a reference value during the blanking and/or synchronizing intervals and adds to the wave a signal which reduces that departure.

It is an object of this invention to reduce the distortion of the television wave which results from non-ideal transmission characteristics of a wide variety of television transmission devices or elements.

Several varieties of correcting circuits of the clamper type (although they might not have been called by the term clamper) are known. One such circuit is shown in United States Patent 2,299,945 to Wendt, issued October 27, 1942. The Wendt circuit is one of the so-called "keyed" circuits for reinserting a direct-current component, that is, it makes use of a triode which is made conducting periodically (that is, it is "keyed") by means of synchronizing pulses or the like to change the charge on a condenser in the grid circuit of the vacuum tube which is to have the reinserted direct current in its output. Such a keyed direct-current reinserting circuit comes under the definition of a clamper given above. The present invention is directed to clamper circuits which can be used in the same places as the clamper circuits of the prior art are used and, in addition, can be utilized in some places where these prior art devices are not suitable.

In accordance with an illustrative embodiment of the invention, a feedback loop clamper circuit is provided in which the low frequency distortion or interference envelope of the signal wave (which may be an R. M. A. standard television signal, for example) is detected (before or after amplification) and mixed with the input signal in proper phase to reduce the distortion or interference envelope. Also by reason of the stable reference value of wave form voltage existing within the feedback loop, it is possible by means of a peak rectifier to secure a peak-to-peak measurement of the signal voltage.

The invention will be more readily understood by referring to the following description taken in connection with the accompanying drawings forming a portion thereof, in which.

Figure 1:
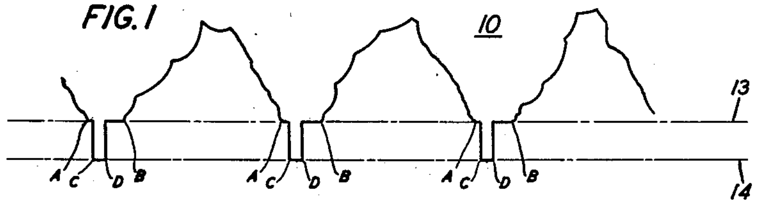
Fig. 1 is a wave form of a section of a standard video wave showing the intervals devoted to picture information together with intervals of fixed signal amplitude which are control or blanking intervals.
Figure 2:
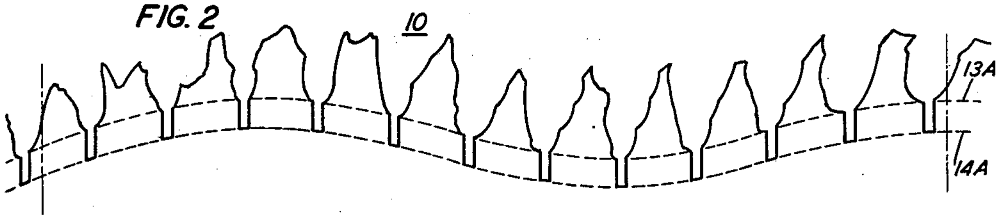
Fig. 2 is a wave form of a section of a standard video wave drawn to a smaller scale than the wave of Fig. 1 and showing as a component thereof a low frequency wave caused by distortion or interference.

Referring more particularly to the drawings, Fig. 1 shows a portion 10 of a typical R. M. A. signal for television. It will be noted that at regularly recurring intervals the wave form returns to reference amplitudes 13 and 14, respectively. The distance between adjacent points A and B of the signal 10 is known as the horizontal blanking interval while the distance between points C and D thereof is representative of the horizontal synchronizing pulses. The reference amplitudes 13 and 14 should be constant but during transmission of the signal the reference amplitudes suffer variations (as shown by dashed lines 13A and 14A in Fig. 2) due to distortions occurring in the transmission apparatus or the addition of interfering waves to the desired signal. Such distortions of the signal during transmission produce degradations of the received television picture quality. Clampers operate to remove these variations of the reference value or values. The clamping interval can be (1) between points A and C, (2) between C and D, or (3) between D and B, depending on where it is desired to "clamp."

Figure 3:
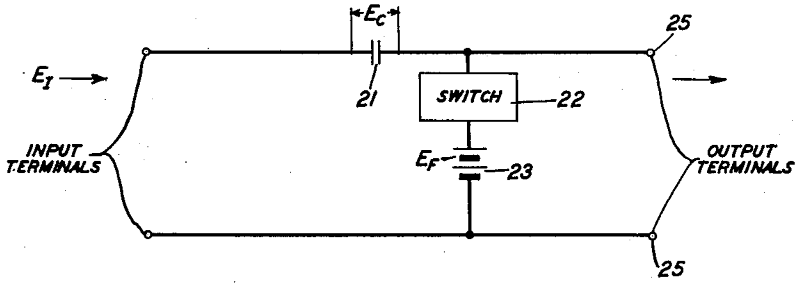
Fig. 3 is a circuit diagram showing the arrangement of the essential clamper components used in previous clamping systems.

In Fig. 3, the received video signal, which has been designated $E_1$ and which contains the distortions in reference value, passes through condenser 21 to the output terminals 25. The switch 22 connects the output to ground or to some fixed potential, such as that represented by the source 23, when it closes. It is arranged to close during the time intervals when the incoming signal should be at some reference value, such as, for example, amplitude 13 or amplitude 14. The difference voltage between the incoming signal and the chosen fixed potential represented by the source 23 during the interval when the switch is closed is impressed as a voltage across the condenser 21, which voltage remains substantially fixed until the next interval when the switch again closes. Variations in the input signal during successive intervals produce variations in charge voltage, represented as the voltage $E_C$ across the condenser 21. The output signal across the terminals 25 is thereby made the difference between the incoming signal and the charge voltage $E_C$ and has substantially no variation in reference during the intervals when the switch 22 is closed. This is perhaps the simplest form of clamper, wherein the condenser charge $E_C$, referred to as the signal envelope, is directly subtracted from the incoming signal $E_I$ to yield a signal having zero envelope or a constant reference value. This signal envelope is substantially equivalent to one of the dashed lines 13A or 14A of Fig. 2 (depending on which reference value is being "clamped"), although instead of the envelope being a smooth curve or line, it is made up of a number of step-functions approximating at low frequencies the curve or line.

Figure 4:
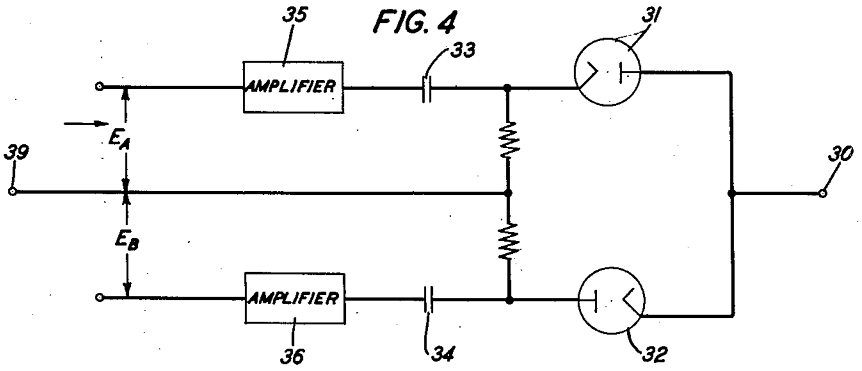
Figs. 4 and 5 are circuit arrangements to aid in the explanation and understanding of the invention.

The switch 22 usually consists of a pair of diodes such as the diodes 31 and 32 shown in Fig. 4, together with blocking condensers 33 and 34, and driving amplifiers 35 and 36. The input signals to these driving amplifiers, represented by $E_A$ and $E_B$, respectively, are pulses of a duration for which it is desired to close the switch and of polarity to cause the diodes 31 and 32 to conduct during the intervals of switch closure. Bias is developed across the blocking condensers 33 and 34, which prevents diode conduction during intervals when the switch is to be open. When the diodes conduct, points 39 and 30 are coupled together through the diodes, blocking condensers and amplifiers. When the diodes 31 and 32 are nonconducting, points 30 and 39 are not coupled. Thus a switching function which can operate sufficiently rapidly is available. Triodes or pentodes can similarly be employed as switching elements.

The prior art arrangement of Fig. 3 has various limitations. First, the output impedance is very high since the grid in a vacuum tube is commonly used to couple the output to other devices. The circuit is not useful to remove distortion at low impedance or high power parts of television apparatus. Second, the output is not in its final useful form, that is, other elements which may be distorting must be used following the clamper. Third, it is operable only with video (that is, not carrier) wave forms.

Figure 5:
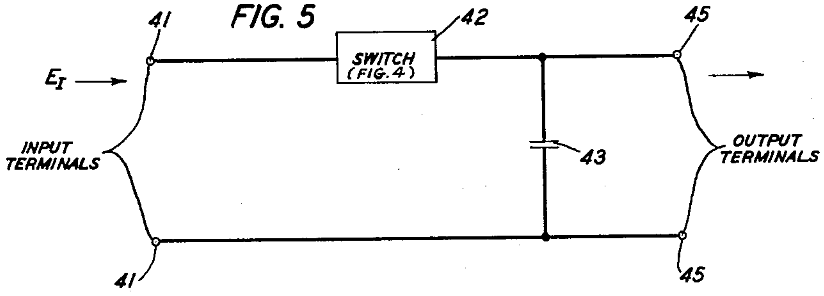

In the arrangement of Fig. 5, the switch and condenser of Fig. 3 are rearranged. The input signal $E_I$ across the terminals 41 passes through a switch 42 and is applied across the condenser 43 connected between the output terminals 45. The switch closes during the clamping intervals (AC, CD, or DB in Fig. 1), impressing the value of the input signal as a charge voltage across the condenser 43. In a preferred embodiment, the switch is of the kind shown in Fig. 4. This voltage is the envelope of values of the input signal during the intervals when the switch is closed. If the input signal is undistorted the value of this envelope is the desired reference value and does not vary with time. When the input signal is distorted the condenser voltage is the distortion envelope of the input signal. The arrangement shown in this figure will be referred to as an "envelope detector."

Figure 6:
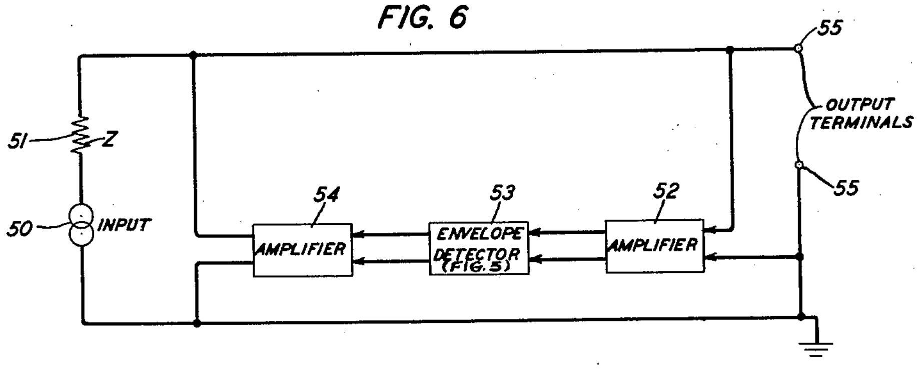
Fig. 6 is a block diagram of a clamper circuit in accordance with the invention.

Fig. 6 is a block schematic diagram of a clamper circuit in accordance with the invention. The envelope detector described in connection with Fig. 5, together with amplifiers used to amplify the distortion and suitably drive and couple the envelope detector, make up the arrangement shown in this figure. The input signal, represented as a source 50 operating through an impedance 51, contains a distortion envelope which is to be removed by the clamper circuit. Any distortion appearing at the output terminals 55 is amplified by amplifier 52 and detected as a distortion envelope by the envelope detector 53. This distortion envelope is coupled back to the output terminals 55 by means of an amplifier 54 in out-of-phase relation (in reverse polarity) with the input signal distortion. The distortion remaining at the output terminals is less than the input distortion by a factor $(1+\mu)$ where $-\mu$ is the total distortion amplification measured from the input of amplifier 52 to the output of amplifier 54. In practice, the amplification $\mu$ is made large enough so that the distortion remaining in the output signal is negligibly small. The circuit operates at low impedances commonly used in transmission cables and the devices can be bridged across a cable at any point to remove any accumulated distortion of such nature as can be removed by clampers.

Figure 7:
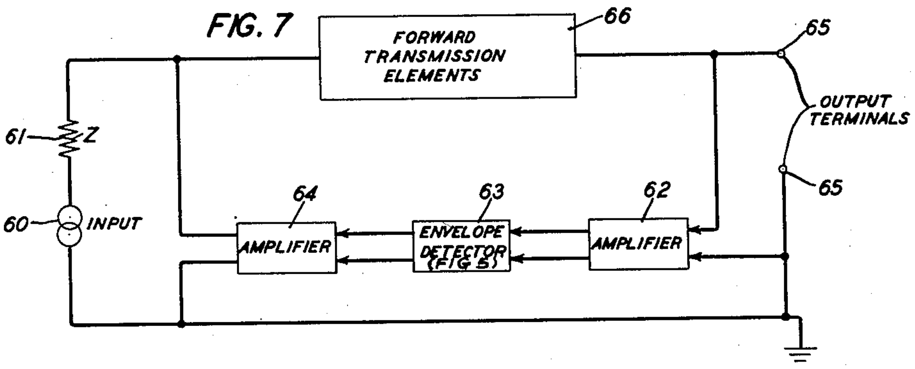
Fig. 7 is another clamper circuit, also in block diagram form, in accordance with the invention.

Fig. 7 illustrates perhaps the most useful application of the principles of the invention. The input signal represented as source 60 may be distorted. It must be transmitted through apparatus 66 which also may distort the signal. At the output of this equipment appears the useful signal. The forward transmission elements represented by the box 66 might comprise an amplifier, or a modulator, or a radio frequency transmitter, or pulse modulation apparatus or other elements that can be employed to convert the incoming signal to a form that is more suitable for transmission or other use. The apparatus 66 is frequently complex and has elements which tend to distort the television signal envelope. The circuit arrangement shown in Fig. 7 reduces this distortion to a negligible value. The distortion which remains in the output signal at terminals 65 is amplified, together with the signal itself, by the amplifier 62. The distortion envelope is obtained by the envelope detector 63. In many cases there must be included between the amplifier 62 and the detector 63 devices appropriate to the character of the output signal. For example, if the output is a carrier wave there must be a rectifier or demodulator associated with the envelope detector so that the video envelope can be derived. The output of the detector 63 is mixed with the input signal by means of amplifier 64 in proper polarity so that the amplified output distortion envelope will subtract from that which would be present without the clamper. The distortion for this circuit arrangement is reduced from its value in the absence of clamping by a factor $(1+\mu)$ where $-\mu$ is the total amplification of the distortion envelope for the elements 62, 63, 64 and 66.

The arrangement can be used to assure at the output of a television radio transmitter an output signal free from envelope distortion and having a fixed carrier reference value. Thus the signal at the antenna can be amplified and rectified to produce the video wave form, and its envelope detected. The envelope is mixed by means of an amplifier at some point in the video amplification chain with the incoming signal.

The distortion and reference values of the radio transmitter are reduced by $(1+\mu)$, the total amplification around this feedback loop.

Figure 8:
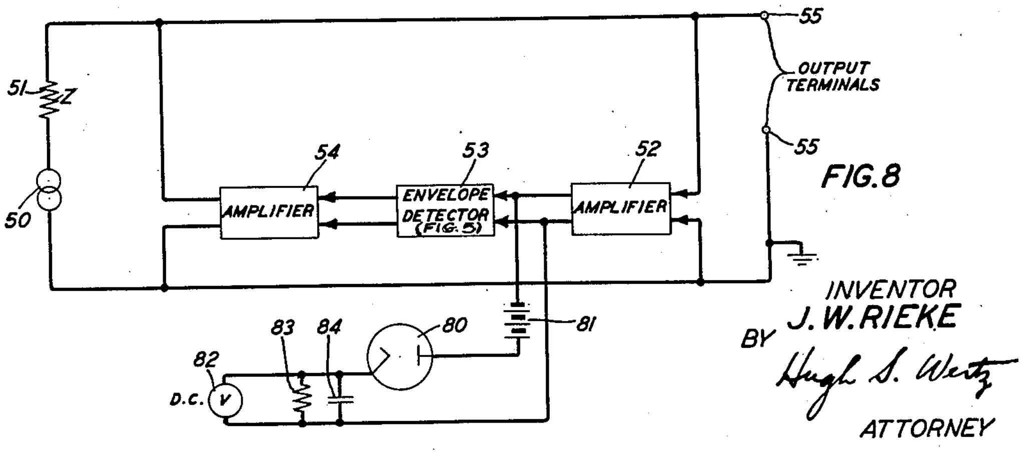
Fig. 8 is a circuit arrangement as in Fig. 6 with the addition of a peak-to-peak voltmeter.

Reference will now be made to Fig. 8, which shows a circuit to provide a peak-to-peak measure of the video output signal. Basically, the clamper circuit is the same as in Fig. 6, and elements designated by the reference characters 50 through 55, inclusive, are similar to correspondingly numbered elements in Fig. 6 and operate in the same manner. The video wave at the output of amplifier 52 is an amplified replica of the output wave form. The operation of the clamper results in the reestablishment of a constant reference value for the bottoms of the synchronizing pulses, in this case. This reference value is a fixed direct-current potential and is independent of the signal. A measure of the peak excursion of the video wave form away from this reference potential is, therefore, a peak-to-peak measurement of the video wave form. In the arrangement of Fig. 8, a direct-current source 81, equal and opposite to the reference voltage at the output of amplifier 52, is connected from this amplifier to the input of a rectifier 80. At this point, the video wave has a reference value equal to zero. The rectifier 80, which can be a diode, charges condenser 84 to the peak value of the wave measured from its zero value at the bottoms of the synchronizing pulses. A direct-current voltmeter 82 measures, therefore, the peak-to-peak voltage of the wave form at the output of amplifier 52. Resistance 83 provides a discharge path for the voltage of condenser 84 and is chosen to give a meter response time constant suited to video operational procedure.

Figure 9:
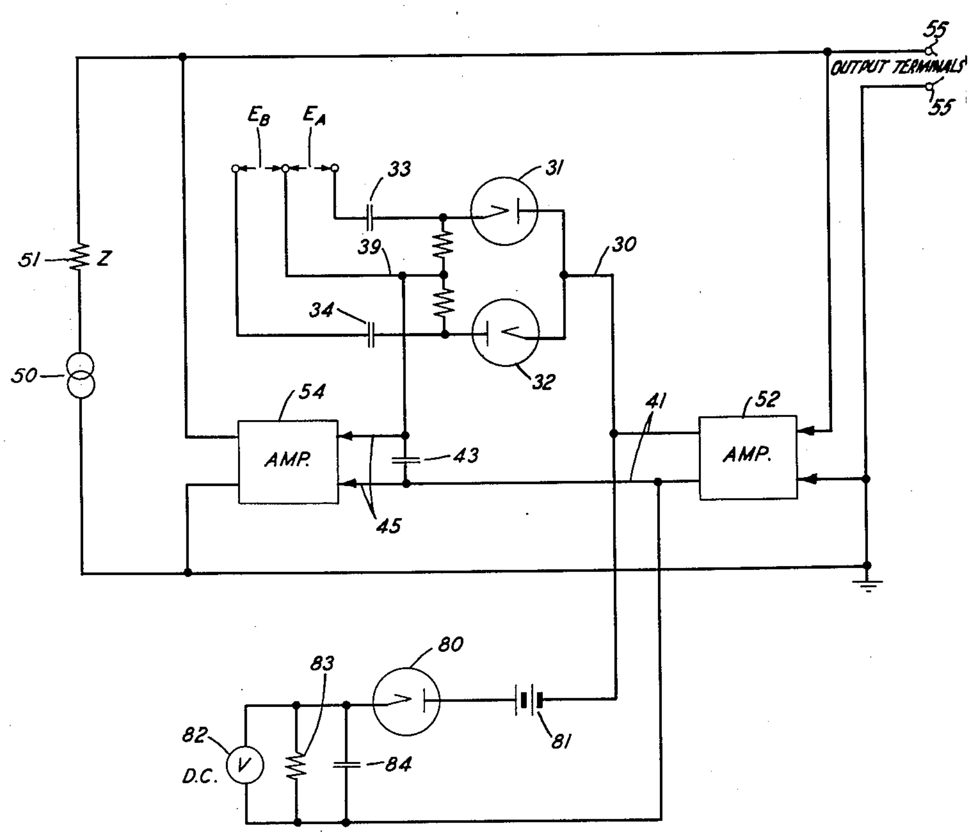
Fig. 9 illustrates, in more diagrammatic form, the circuit arrangement of Fig. 8.

In Fig. 9, the arrangement of Fig. 8 is shown in a form that better illustrates the interconnection of the various elements. In this figure, the various elements are similarly numbered as the corresponding elements in Figs. 4, 5, 6 and 8. The only elements shown in block schematic form are the amplifiers 52 and 54 which may take the form of any of the many suitable D.-C. amplifiers well known in the art.

It is to be understood that the above-described arrangements are illustrative of the application of the principles of the invention. Numerous other arrangements may be devised by those skilled in the art without departing from the spirit and scope of the invention.

What is claimed is:

1. In combination, a source of signal voltage of the type which has a first component with recurring portions at a fixed amplitude and which may have a second component comprising a low frequency wave caused by distortion or interference, an output circuit for said source having a pair of output terminals, a first and a second amplifier, each having a pair of input terminals and a pair of output terminals, one of the input pair of said first amplifier and one of the output pair of said second amplifier being connected directly by a substantially loss-less connection to one of the output terminals of said output circuit and the other of the input pair of said first amplifier and the other of the output pair of said second amplifier being connected directly by a substantially loss-less connection to the other of the output terminals of said output circuit, an envelope detector having a pair of input terminals and a pair of output terminals, the pair of input terminals being connected to the pair of output terminals of said first amplifier and the pair of output terminals being connected to the pair of input terminals of said second amplifier, and means connected between the pair of output terminals of said first amplifier for measuring the peak signal value.

2. In combination, a source of signal voltage of the type which has a first component with recurring portions at a fixed amplitude and which may have a second component comprising a low frequency wave caused by distortion or interference, an output circuit for said source having a pair of output terminals, a first and a second amplifier, each having a pair of input terminals and a pair of output terminals, one of the input pair of said first amplifier and one of the output pair of said second amplifier being connected directly by a substantially loss-less connection to one of the output terminals of said output circuit and the other of the input pair of said first amplifier and the other of the output pair of said second amplifier being connected directly by a substantially loss-less connection to the other of the output terminals of said output circuit, and an envelope detector having a pair of input terminals and a pair of output terminals, the pair of input terminals being connected to the pair of output terminals of said first amplifier and the pair of output terminals being connected to the pair of input terminals of said second amplifier.

3. The combination of claim 2 in which the envelope detector comprises switching means connected serially between an input and an output terminal of said detector and capacitance means connected between the two output terminals of said detector.

JOHN W. RIEKE.

REFERENCES CITED

The following references are of record in the file of this patent:

UNITED STATES PATENTS

| Number | Name | Date |
|---|---|---|
| 1,773,772 | Berthold | Aug. 26, 1930 |
| 2,151,145 | Percival | Mar. 21, 1939 |
| 2,223,982 | Bedford | Dec. 3, 1940 |
| 2,307,375 | Blumlein et al. | Jan. 5, 1943 |
| 2,307,387 | Blumlein | Jan. 5, 1943 |
| 2,323,762 | George | July 6, 1943 |

FOREIGN PATENTS

| Number | Country | Date |
|---|---|---|
| 505,057 | Great Britain | May 4, 1939 |
| 525,629 | Great Britain | Sept. 2, 1940 |